United States Patent [19]

Bien

[11] Patent Number: 5,387,039
[45] Date of Patent: Feb. 7, 1995

[54] AC TRACTION MOTOR WITH DRIVE END BEARING ASSEMBLY FOR LOCOMOTIVE

[75] Inventor: Paul R. Bien, Erie, Pa.
[73] Assignee: General Electric Company, Erie, Pa.
[21] Appl. No.: 160,515
[22] Filed: Dec. 1, 1993
[51] Int. Cl.6 .................................................. F16C 33/80
[52] U.S. Cl. ........................................ 384/477; 277/57; 277/75; 384/480
[58] Field of Search ................ 384/477, 480; 310/255; 277/3, 29, 57, 75

[56] References Cited

U.S. PATENT DOCUMENTS

| | | | |
|---|---|---|---|
| 3,127,181 | 3/1964 | Crego et al. | 277/57 |
| 4,130,065 | 12/1978 | Susdorf et al. | 310/255 |
| 4,848,937 | 7/1989 | Hartman et al. | 277/57 X |
| 5,288,154 | 2/1994 | Jost | 384/480 |

Primary Examiner—Thomas R. Hannon
Attorney, Agent, or Firm—Ann M. Kratz; Marvin Snyder

[57] ABSTRACT

A pinion end bearing assembly for supporting and sealing about a shaft which extends through the frame of a traction motor, such as an AC traction motor. The assembly having a rearward end plate assembly attached to the frame, a housing attached to the frame, the shaft extending through the housing and a rotatable element attached to and circumscribing the shaft between the housing and shaft. The rotatable element and the housing adapted to form a series of three labyrinth seals to restrain the flow of air from within the motor to a bearing chamber with the seals being separated by venting chambers to vent to a low pressure reservoir any air which may flow through the labyrinth seals.

12 Claims, 7 Drawing Sheets

AC TRACTION MOTOR WITH DRIVE END BEARING ASSEMBLY FOR LOCOMOTIVE

BACKGROUND OF THE INVENTION

The invention relates generally to AC traction motors and more particularly to AC traction motors for locomotives.

Locomotives typically have either a large diesel engine which drives an alternator or are powered by externally supplied electricity. The electrical power from the alternator or external supply is then conducted to traction motors located beneath a platform of the locomotive. The traction motors convert the electrical power to rotational power. The traction motors in turn operatively engage axles to which wheels are attached, and rotate the wheels thereby driving the locomotive.

Traction motors are large electrical motors having the typical motor housing, stator and rotor assembly. Attached to the rotor is a shaft which extends through the housing. Fixedly attached to a pinion end of the shaft is a motor pinion which in turn engages a bull or axle gear for rotating the axle.

At the point where the shaft extends through the housing, the motor includes a drive end bearing assembly. The bearing assembly supports the drive end of the shaft and allows the shaft to rotate relative to the housing. The bearing assembly includes a rotational element such as roller bearings which must be lubricated to limit frictional heating or the bearings will overheat and fail. The bearing assembly also prevents the leakage of lubrication into the interior of the traction motor.

The lubrication of the bearing may be done with different types of lubricating medium. One of the more prevalent types is grease, and the bearings are packed with the grease. It is also known to lubricate the bearings with oil. The use of oil however has several drawbacks. One drawback is that a high static oil level, although insuring an adequate lubricant quantity, results in high viscous losses and high operating temperature. To overcome this drawback, oil feeds are generally employed to circulate a flow of oil through the bearing assembly.

To provide the circulation of oil to the bearing assembly, gravity feeds may be used to eliminate the need for pumps, etc. However, a drawback of using gravity feeds is that there is little pressure generated to force the oil through the oil inlet into the bearing assembly. If the bearing assembly is pressurized relative to the oil supply, the flow of oil into the bearing assembly may be hindered thus preventing the proper flow of oil into the bearing assembly. A lack of sufficient flow may lead to bearing failure.

The cooling of traction motors in locomotive applications also becomes critical in order to maximize or increase the operating life of the traction motor. To cool the motors, blowers are mounted on the locomotive. The blowers pressurize and discharge the pressurized air into a plenum chamber formed within the platform between horizontal upper and lower plates and a pair of vertical I-beams which extend along the sides of the platform and separate the upper or lower plates. Flexible air bellows then connect the interiors of connector ends of the motors to the plenum chamber so that the pressurized air flows into the connector end of the motor.

Air which is introduced into the connector end or commutator end in the case of D.C. Motors, of the motor flows through passageways, formed in the stator and rotor, to the drive end of the motor. As the air flows through the motor, the heat is transferred to the air thereby cooling the motor. The air then flows from the drive end into the environment.

The flow of cooling air from the connector end to the opposite drive end of the motor causes heating of the cooling air before the air reaches the drive end. The heated air may cause the drive end bearing assembly to reach an operating temperature which reduces the period of time the bearing assembly may be operated between maintenance servicing. This reduction of the service period is undesirable.

The flow of air through the passageways also causes a drop in the pressure of the air before the air reaches the drive end of the motor. However, the pressure of the air may still be above the pressure of the oil supply for the bearing assembly at the drive end. This adverse pressure effect is worsened if cooling air is introduced at the drive end.

The pressurized air in the drive end of the motor may cause a small flow of the pressurized air into the drive end bearing assembly. The bearing assembly may then become pressurized relative to the gravity oil feed system. As noted above, this pressurization may hinder the flow of oil into the bearing assembly which is undesirable.

It is therefore an object of the present invention to provide an improved AC traction motor assembly for a locomotive having an oil lubricated bearing assembly for rotatably supporting the drive end of a shaft of the motor.

An additional object of the present invention is to provide an improved AC traction motor having drive end bearing assembly in which the motor and bearing assembly are configured to increase the service life of the bearing assembly.

Yet another object of the present invention is to provide an improved oil feed system to provide a circulation of oil through a drive end bearing assembly for a locomotive traction motor.

A further object of the present invention is to provide an improved drive end sealing assembly which reduces any pressure differential between the supply of an oil feed system and the bearing assembly to reduce any hinderance to the flow of oil into the bearing assembly from the oil feed.

SUMMARY OF THE INVENTION

Accordingly, a traction motor for a locomotive with a drive end bearing assembly is provided. The motor has a frame with a drive end portion and a connector end portion, the frame forming at least one cooling air entrance aperture in the drive end portion, and at least one cooling air exit aperture in the connector end portion. A shaft axially extends within the motor and exits the frame through an opening with the shaft having a pinion end extending outside the frame. The pinion end is connected to a pinion which operatively engages an axle gear of the locomotive. The axle gear rotates within the interior of a gear case.

A source of pressurized air is connected to the entrance aperture in the drive end of the motor for providing a flow of air into the drive end of the motor frame, the air flowing within the frame and exiting the frame through the exit aperture. The rotor assembly and stator assembly preferably include passageways for the flow of air therethrough.

A drive end bearing assembly has a bearing set which is disposed in a bearing cavity to rotatably support the shaft. The bearing assembly also includes; a housing attached to a forward face of the drive end of the frame with the shaft extending through the housing, and a rotatable element attached to and circumscribing the shaft between the housing and shaft, the housing and rotatable element forming an interface whereby air from the pinion end chamber may flow to the bearing cavity. The housing and rotatable element are configured to form a plurality of labyrinth sealing means for restraining the flow of the air along the interface, the housing and rotatable element are also configured to form a series of venting chambers along the interface disposed among the labyrinth sealing means, the housing forming a portion of venting passageways corresponding to the venting chambers and extending between corresponding venting chambers and at least one lower pressure reservoir, whereby air flowing into the venting chambers is vented off to the low pressure reservoir.

The bearing assembly may also include an end seal plate attached to the pinion end of the motor frame. The pinion end plate forms an oil input port to provide a pathway for the flow of oil from the gearcase chamber into the bearing cavity and also forms a passageway between the bearing cavity and gearcase chamber to vent to the gearcase chamber, air which may enter the bearing cavity from the interface.

DESCRIPTION OF THE PREFERRED EMBODIMENTS

Figure 1:
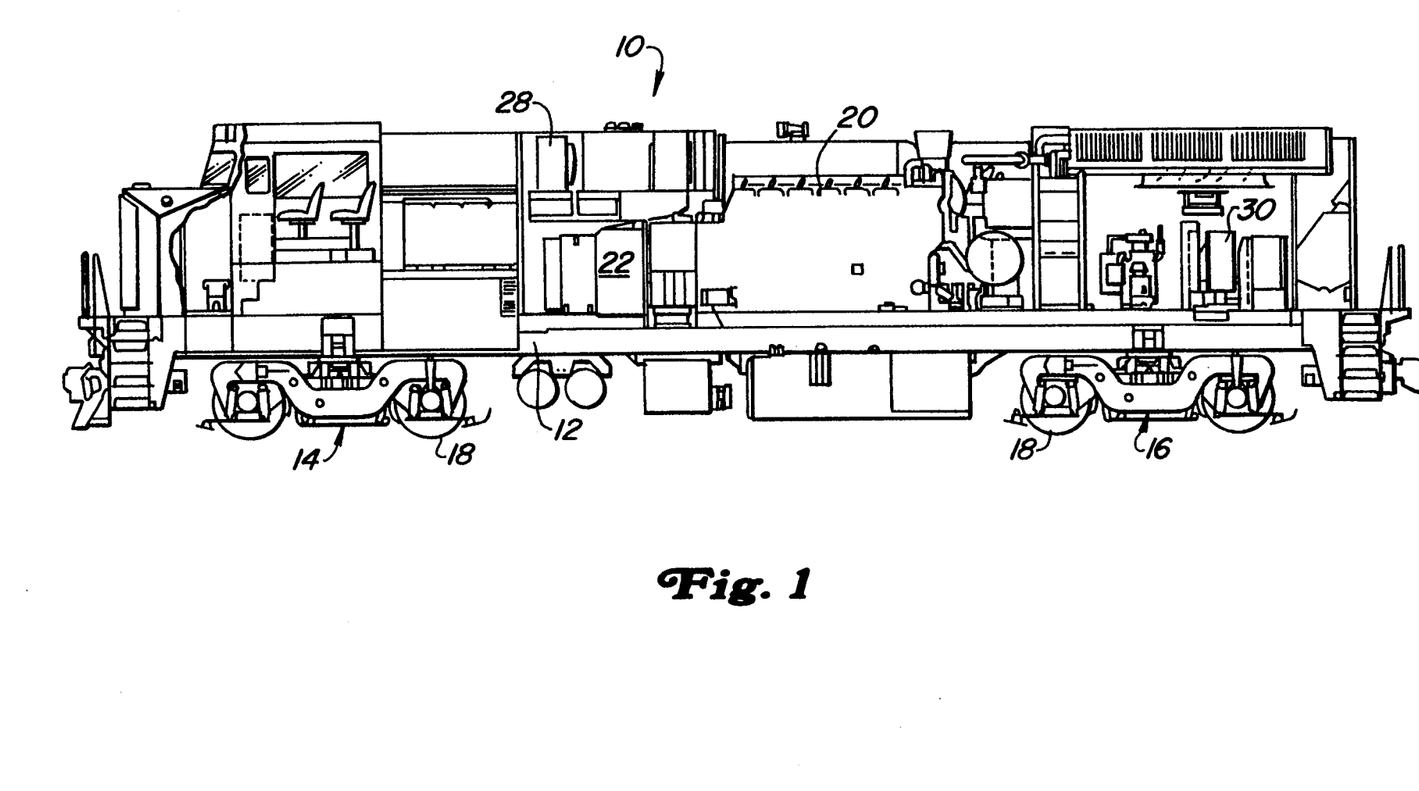
FIG. 1 is an elevational view of a typical diesel locomotive with a sidewall removed for clarity.

Referring to FIG. 1, a locomotive is generally indicated at 10. The locomotive 10 includes a horizontal, longitudinally extending platform 12. To the underside of the platform, a forward truck 14 and a rearward truck 16 are mounted. Rotatably mounted to the forward and rearward trucks, 14, 16 are wheels 18.

Figure 2:
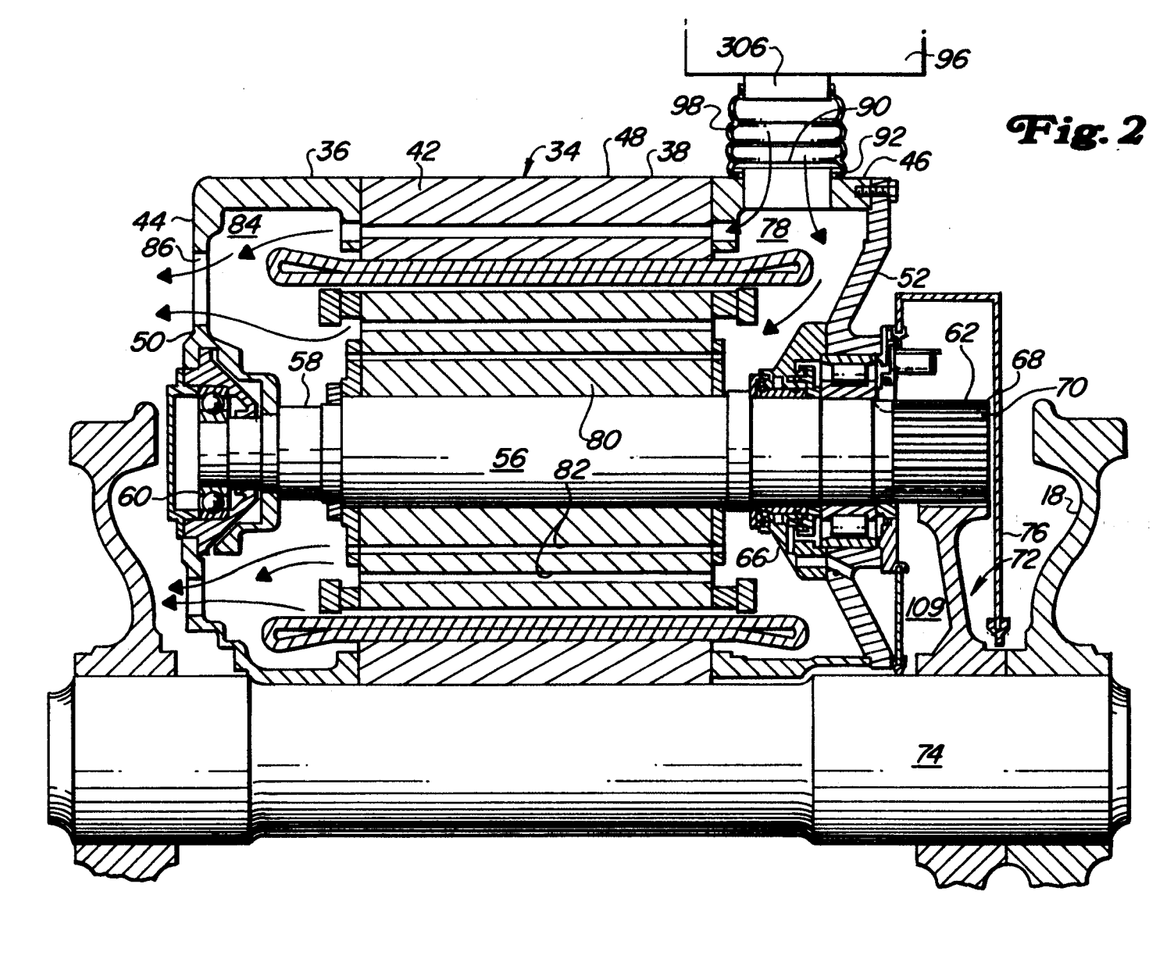
FIG. 2 is an elevational sectional view of an AC traction motor, mounted on the locomotive of FIG. 1 and showing an air flow configuration.

Attached to the upper side of the platform 12 is an engine 20, generally a diesel engine, which provides rotational power for turning an alternator 22. The alternator 22 supplies electrical power for driving a forward traction motor 34 (FIG. 2). The forward traction motor 34 in turn rotatably drives one of the axles of the forward truck 14. A similar arrangement drives the other axles of the forward truck 14 as well as the axles and wheels 18 of the rearward truck 16.

The locomotive 10 also includes a first blower 28 and a second blower 30, which provide cooling air to the forward traction motors 34 and rearward traction motors, respectively, in a manner described below.

Referring to FIG. 2, the alternating current (AC) traction motor embodying the present invention is generally indicated at 34. The motor 34 includes a frame 36 which has a middle or stator portion 38. The stator portion 38 is adapted to receive a stator core assembly 42. The motor frame 36 also has a connector end portion 44 and a drive or pinion end portion 46 which bracket the stator portion 38. The motor frame 36 may be made up of several individual members such as a central stator housing 48, a connector end plate 50 and a pinion end plate 52.

Axially extending through the motor frame 36 is motor shaft 56. The motor shaft 56 has a non-pinion or connector end 58 which is rotatably supported by a connector bearing assembly 60. An opposite pinion or drive end 62 extends through the drive end portion 46 of the motor frame 36. At the point where the shaft 56 extends through the motor frame 36, the shaft is rotatably supported by a pinion end bearing frame assembly 66 constructed in accordance with this invention.

A pinion gear 68 is connected to the pinion end portion 62 of the shaft 56. The pinion gear 68 includes gear teeth 70 which extend axially along the pinion gear 68 and operatively engaged with an axle gear 72. The axle gear 72 in turn drives an axle 74 to which the wheel 18 is attached. The axle gear 72 and pinion gear are housed in a gearcase 76 which is connected to the pinion end 62 of the motor frame 36 and circumscribes the axle 74.

As disclosed in AC Traction Motor for Locomotive, Ser. No. 08/097,607, filed Jul. 27, 1993, and incorporated by reference herein, to cool the bearing assembly 66, the motor 24 is configured so that cooling air is introduced into a pinion end chamber 78 formed in the pinion end 46 of the motor; flows generally axially forward through passageways 82 formed in the stator 79 and rotor 80 of the motor; flows into a connector end chamber 84 formed in the connector end 44 of the motor and exits out of the connector end 58 through exit orifices 86. The exit orifices 86 are radially spaced about the connector end plate 50 and provide an outlet for the cooling air to flow into the environment. Introducing the air into the pinion end 46 prevents heating of the air before the air contacts the drive end bearing assembly 66. Also because the motor 24 is an AC motor, there are no brushes and commutator which generate and dissipate a large amount of heat in the connector end 58; and therefore, the need to introduce the cooling air into the connector end 44 is lessened.

The cooling air flows into the pinion end portion 46 through a passageway 90 formed by a flanged duct 92 which is axially and radially aligned with the bearing assembly 66. Except for the duct 92, the pinion end portion 46 is generally sealed to prevent the flow of air from the environment into the pinion end 46.

Referring to FIG. 1, in conjunction with FIG. 2, to provide cooling air to the duct 92, cooling air from the first blower 28 and second blower 30 is conveyed to a plenum chamber 96 which is formed within the platform 12 and extends longitudinally down the platform. To provide an air passageway from the duct 92 to the plenum chamber 96, a flexible elastomeric bellows 98 connects the duct to an outlet 306 of the plenum chamber.

FIG. 2 diagrammatically illustrates the platform 12 and plenum chamber 96. Typically, the motor 24 is mounted generally to the side of the wheel 18, and the bellows 98 extends from the duct 92 horizontally a short distance before turning upward where the bellows connects to the plenum chamber 96.

In operation, the first blower 28 and second blower 30 draw in cooling air from the environment, pressurize the air and discharge the air into the plenum chamber 96. The air then flows throughout the plenum chamber 96, and a portion of the air exits the plenum chamber by flowing through the bellows 98 and duct 92 and into the pinion end chamber 78 of the motor 24.

Because the duct 92 is axially and radially aligned with the pinion end bearing assembly 66, the duct directs at least a portion of the air entering the pinion end chamber 78 over the pinion end bearing assembly 66, thereby cooling the bearing assembly.

Because the cooling air flows directly from the plenum chamber 96 into the pinion end of the motor 34, the pressure of the air has not been reduced by the flowing of the air through the passageways 82, in the stator 42 and rotor 80. The pressure of the air in the pinion end 34 is thus much higher than if the flow of air had been introduced into the connector end portion 44 of the motor 24.

The air then flows from the pinion end chamber 78 through the passageways 82 in the rotor 80 and the stator 42. As the air flows through the passageways 82 the air transfers heat from the stator 42 and rotor 80 by convection thereby cooling the stator and rotor. The air flows from the passageways 82, into the connector end chamber 84 and then exits the motor through the exit orifices 86.

Although the cooling air is introduced into the pinion end chamber 78 and flows through the motor 34 to the connector end chamber 78, the introduction of cooling air in the connector end chamber and flowing the air through the motor into the pinion end chamber 78 may still cause the pressure of the air in the pinion end chamber to be greater than atmospheric. Thus, the potential for the cooling air to pressurize the drive end bearing assembly 66 relative to an oil feed exists whether the cooling air is introduced into the pinion end 78 or connector end 84.

Figure 3:
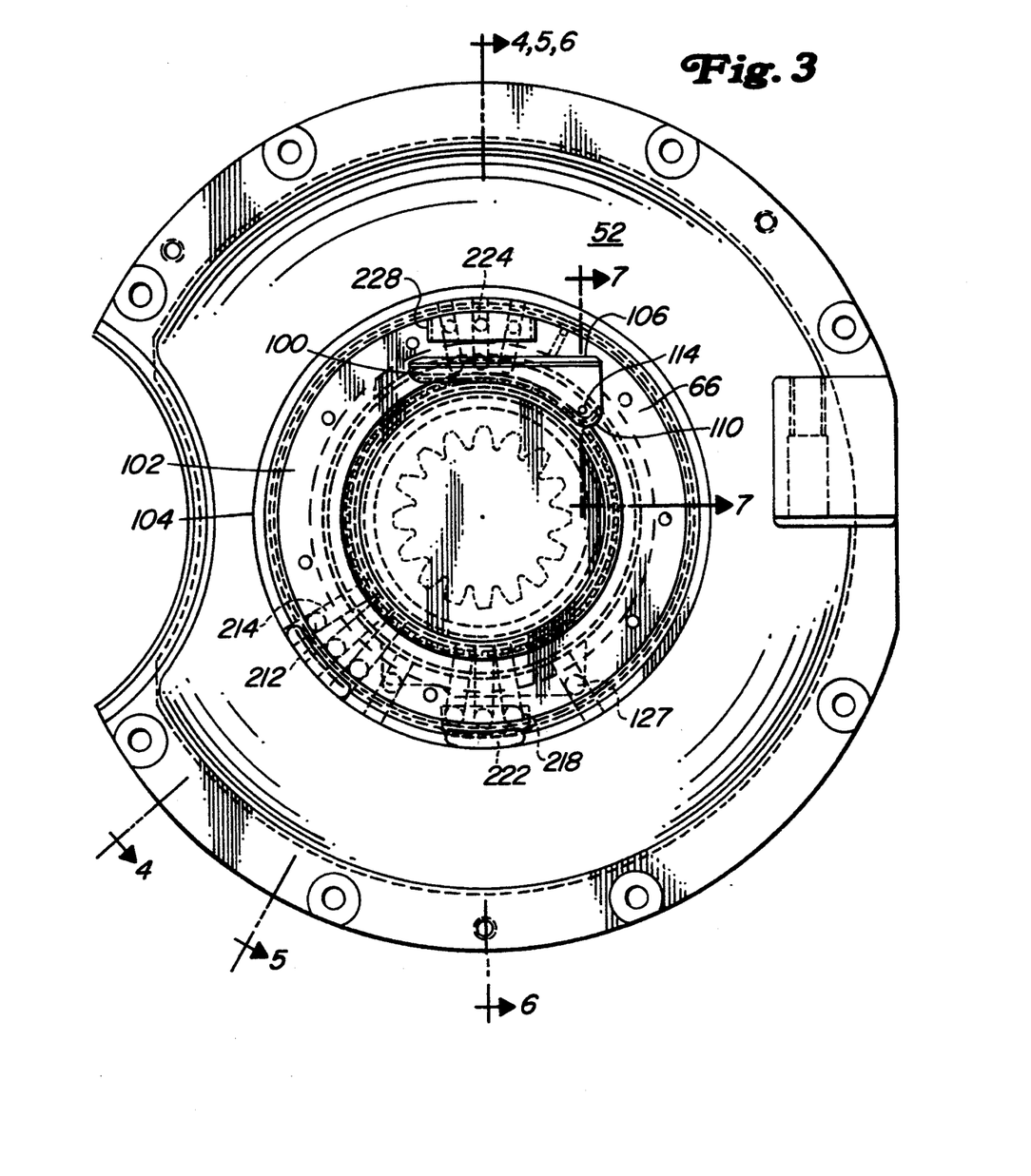
FIG. 3 is a drive end plan view of the motor of FIG. 2.

Referring to FIG. 3, to supply a lubricating medium such as oil to the bearing assembly 66, the bearing assembly includes an oil collection tray 100 which is attached to an outer face 102 of an end ring 104. The end ring 104 is attached to the pinion end plate 52 of the motor frame 36. The oil collection tray 100 is pocket shaped and includes a perforated top 106 which is spaced from the outer face 102 and a lower edge 110 which sealingly engages the outer face. Referring to FIG. 2 in conjunction with FIG. 3, to provide a lubricating medium such as oil to the tray 100 a pool of the lubricating medium is generally retained in the bottom of the gearcase 76. As the axle gear 72 rotates, the teeth of the axle gear dip into the pool of oil and then the centrifugal forces of the rotating gear teeth sprays the oil within a chamber 109 formed by the gearcase 76. A portion of the sprayed oil drips from the outer face 102 and drops of the lubricating medium fall directly onto perforated metal screen 106 and into the tray.

Figure 6:
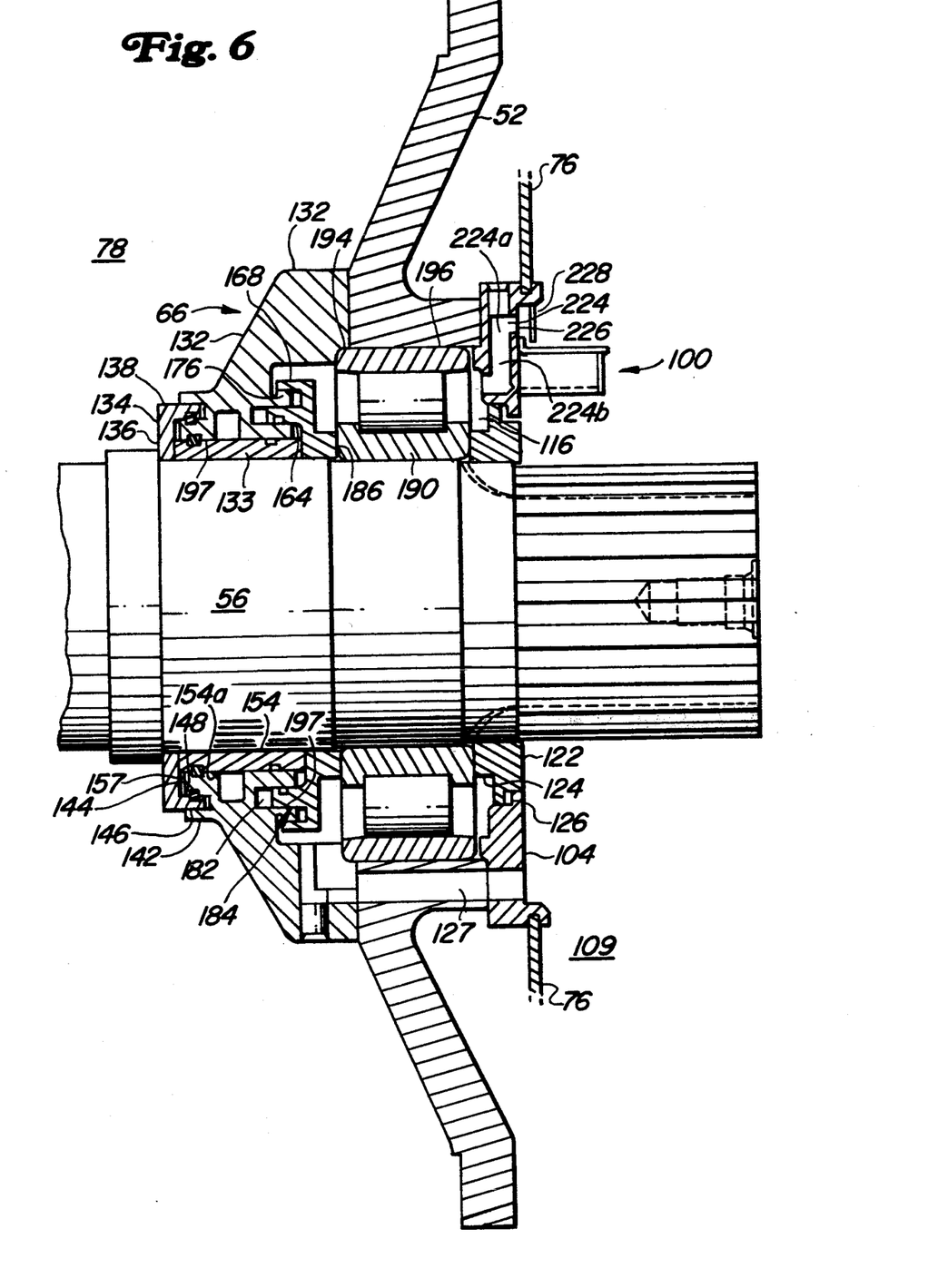
FIG. 6 is a sectional view of the bearing assembly taken generally along the line 6—6 in FIG. 3 and in the direction generally indicated.
Figure 7:
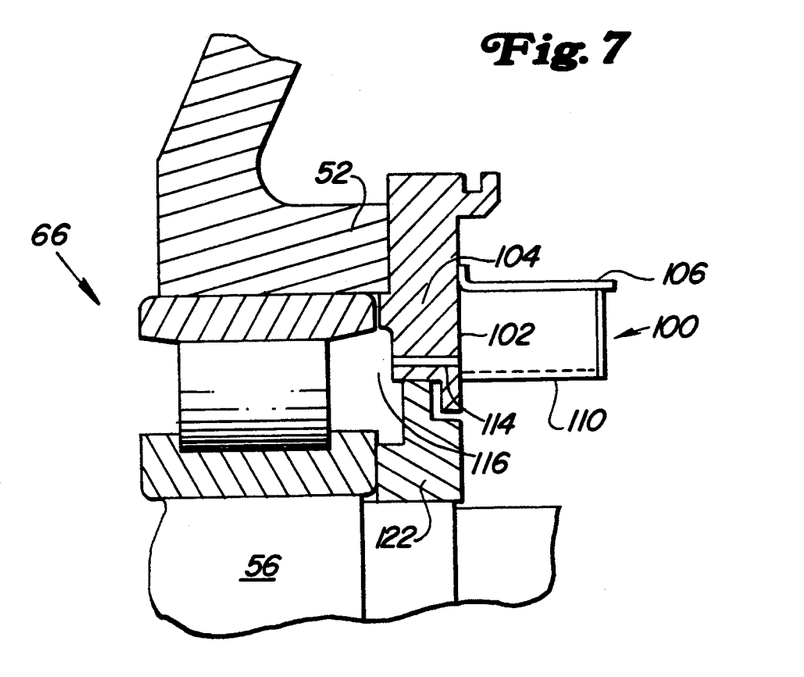
FIG. 7 is a sectional view of a portion of the bearing assembly taken generally along the line 7—7 in FIG. 3 and in the direction generally indicated.

Referring to FIG. 6, to collect the oil which is received in the oil collection tray 100, the oil collection tray includes a downwardly depending collection well 110 portion located generally along one side of the tray. A lubricating port 114 horizontally aligned with the well 110 extends axially forward through the end ring 104 and provides for the fluid communication of oil from the oil collection tray 100 to a bearing chamber or cavity 116 formed by the bearing assembly 66. The screen 106 collects foreign particles and prevents plugging of the port. As oil collects in the oil collection tray 100, the oil in the collection well 110 becomes pressurized due to static pressure head which forces oil through the lubricating port 114 into the bearing cavity 116 unless the bearing cavity 116 is at a higher pressure than the oil within the well. If the bearing cavity 116 is at a higher pressure, the flow of oil through the lubricating port 114 may be hindered.

Figure 4:
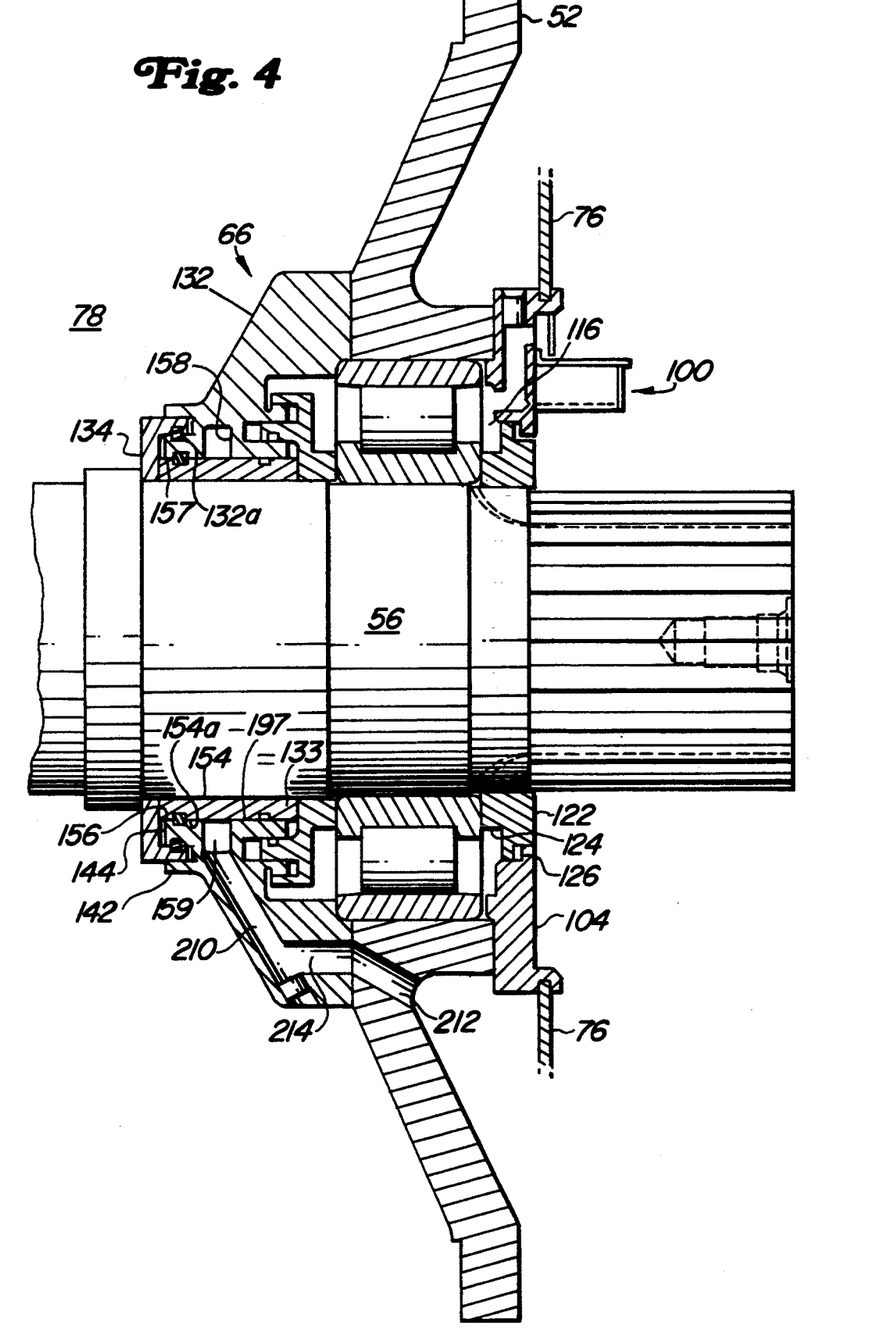
FIG. 4 is a sectional view of a bearing assembly forming part of the motor of FIG. 3 and taken generally along the line 4—4 in FIG. 3 and in the direction generally indicated.

Referring to FIGS. 2 and 4, as noted above, the pinion end chamber 78 may be pressurized due to the introduction of cooling air into the motor frame and particularly when the cooling air is introduced directly into the pinion end 46 of the frame 36. If the pressurization of the air within the pinion end portion 46 causes the bearing cavity 116 to become pressurized in relation to the interior of the gearcase 76 and collection well 110, the pressurization may hinder or stop the flow of lubricating medium through the lubricating port 114. Such hinderance or obstruction of the lubricating medium may cause the bearing assembly 66 to fail.

Referring to FIG. 4, the bearing frame assembly 66, includes an inner end seal 122 which is generally aligned with the pinion end plate 52. The end seal 122 is attached to and rotates with the shaft 56. The inner end seal 122 includes an outer circumferential surface 124 having a cross section formed in a step like configuration. The outer surface 124 sealingly engages an inner circumferential surface 126 of the stationary outer end ring 104 with the inner surface of the end ring formed in a step like configuration to conform to the outer surface 124. The outer end ring 104 is bolted to the rear face of the pinion end plate 52.

Referring to FIGS. 3 and 6, to provide drainage back to the gearcase 76 for the oil which flows into the bearing cavity 116 through the lubricating port 114, the end seal ring 104 forms at least one and preferably a plurality of exit passageways 127. The passageways 127 are grouped at approximately 5 and 7 o'clock of the end ring 104 (FIG. 3). The passageway 127 also serves as vents to allow the venting to the interior of the gearcase 76 pressurized air which may enter the bearing cavity 116.

Referring to FIG. 6, fixedly attached to the forward face of the pinion end plate 52 is housing 132 which forms a stationary part of the bearing assembly 66. The bearing assembly 66 also includes a rotatable component 133 which is attached to the shaft 56 and adapted to form a series of labyrinth seals and venting chambers with the housing as is later described.

The rotatable element 133 includes forward collar 134 generally forward of the housing 132 which circumscribes and engages the shaft 56 for rotation with the shaft. The forward collar 134 has a radially extending flange 136 and an annular flange 138 which extends axially rearward from the outer tip of the radial flange. The housing 132 forms an outer annular flange 142 and an inner annular flange 144 both of which extend forward to bracket and sealingly contact the outer face 146 and inner face 148 respectively of the annular flange 138 of the forward collar 134.

Referring to FIG. 4, attached to and circumscribing the shaft 56 and contacting the rearward end of the forward collar 134 is a tubular sleeve 154. The outer surface 154a of the sleeve sealingly contacts the inner face 156 of the inner annular flange 144 of the housing 132. The sealing contact between the forward collar 134 and outer flange 142 and inner flange 144 and the sealing contact between the sleeve 154 and inner flange define a first labyrinth seal 157 for restraining the flow of air from the pinion end chamber 78 to the bearing cavity 116.

Rearward of the first labyrinth seal 157, the housing 132 has an annular surface 132a which faces the outer surface 154a of the sleeve 154. Along the annular surface 132a, the housing forms a radially extending groove 158. The groove 158 and sleeve 154 form a first venting cavity 159.

Figure 5:
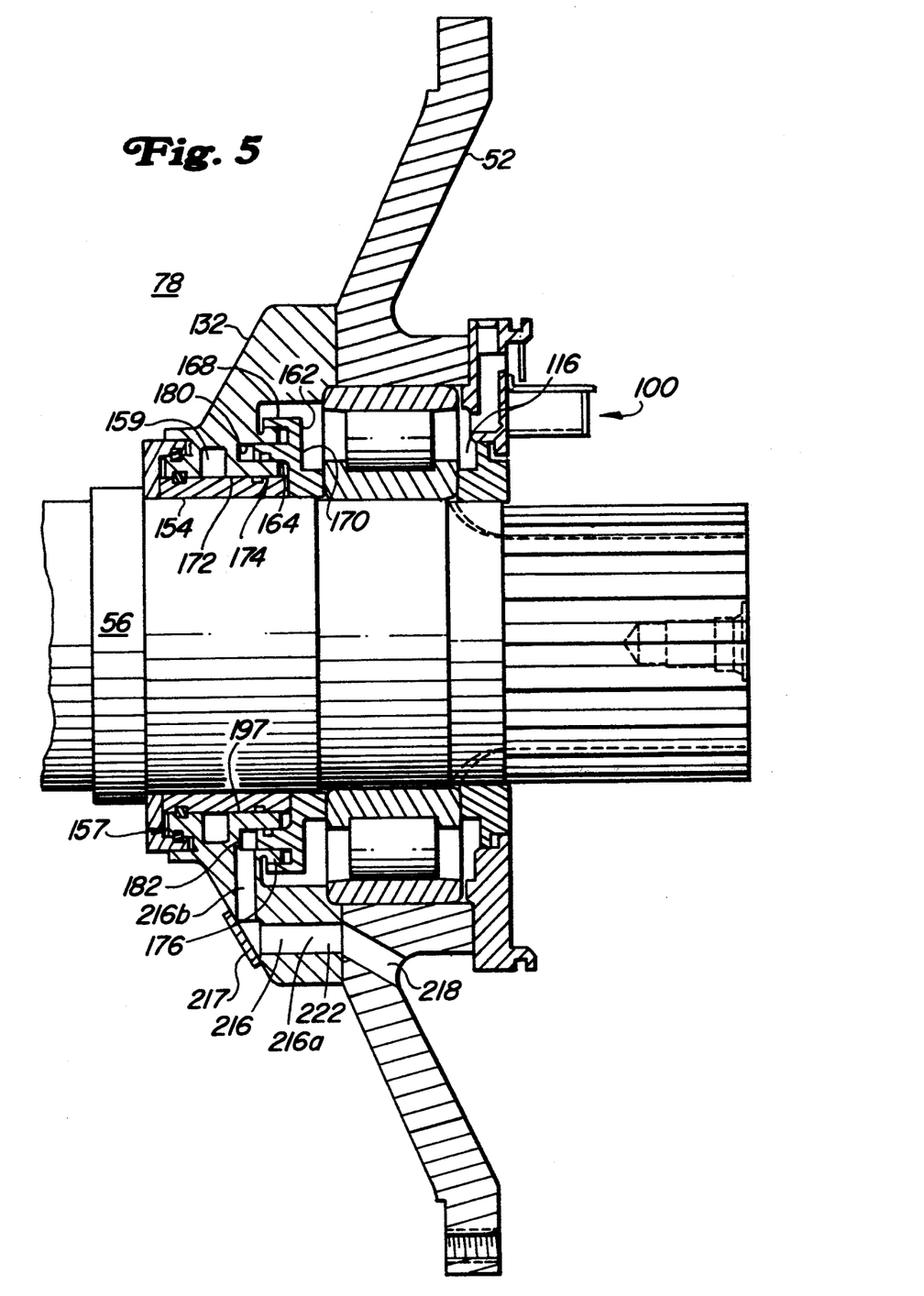
FIG. 5 is a sectional view of the bearing assembly and taken generally along the line 5—5 in FIG. 3 and in the direction generally indicated.

Referring to FIG. 5, attached to the shaft 56, contacting the rearward end of the sleeve 154 and extending generally radially outward from the shaft 56 is a rear collar 162. The rear collar 162 has an inner annular flange 164 and a outer annular flange 168. The inner flange 164 and outer flange 168 are integrally connected to and extend forward from a radial flange 170.

The housing 132 has an inner annular flange 172 which extends rearward between and sealingly contacts the sleeve 154 and inner flange 164 of the rearward collar 162. The sealing contact between the inner flange 172 and sleeve 154 and between the inner flange 172 and the inner flange 164 of the rear collar 162 form a second labyrinth seal 174 for restraining the flow of air from the pinion end chamber 78 to the bearing cavity 116.

The housing 132 also forms an outer annular flange 176. The outer annular flange 176 and inner flange 172 of the housing 132 form an annular groove 180 into which the inner flange 164 of the rear collar 162 extends. The inner flange 164, however, does not extend into the groove 180 for the entire axial length of the groove so that the housing 132 and inner flange 164 form a second venting chamber 182 which circumscribes the shaft 56.

Referring to FIG. 6, the rear outer flange 176 of the housing 132 extends between and sealingly contacts the inner flange 164 and outer flange 168 of the rear collar 162. The sealing contact between the outer flange 176, inner flange 164 and outer flange 168 form a third labyrinth seal 184 which restrains the flow of air from the pinion end chamber 78 to the bearing cavity 116.

The rear collar 162 forms a rear shoulder 186 and the inner end seal 122 forms a forward shoulder which contacts and positions an inner race 190 of bearing 194 which are disposed in the bearing cavity 116. The housing 132 and pinion end plate 52 contact an outer race 196 of the bearing to position and retain the bearing.

For the air within the pinion end chamber 78 to reach the bearing cavity 116, the air must flow along an interface 197 which is formed between the forward collar 134 and the housing 132, then between the sleeve 154 and the housing and then between the housing and the rear collar 162. Thus the air must flow from the pinion end chamber 78 along the interface 197 through the first labyrinth seal 157, the first venting chamber 158, the second labyrinth seal 174, the second venting chamber 182 and the third labyrinth seal 184 to the bearing cavity 116.

Referring to FIG. 4 in conjunction with FIG. 3, the housing 132 forms at least one or more and preferably three vents 210 which extend from the pinion end plate 52 generally forward to the first venting chamber 159. The pinion end plate 52 forms orifices 212 one of which extends from each of the vents 210 to a reservoir such as the ambient environment which is at a lower pressure than the pinion end chamber 78. Each of the vents 210 and corresponding orifices 212 thus form passageways 214 to provide fluid communication between the first venting cavity 158 and the environment so that air which may flow along the interface 197 through the first labyrinth seal 157 to the first venting cavity 158 may be bled or vented off to the environment.

Referring to FIG. 5, in conjunction with FIG. 3, the housing 132 also forms at least one or more and preferably three vents 216 which include an outer portion 216a which extends from the pinion end plate 52 generally axially forward and an inner portion 216b which extends radially upward to the second venting chamber 182. To assist in manufacturing, the outer and inner portions 216a and 216b may extend to the interface between the drive end chamber 78 and the housing 132 with the opening covered by a welded plate 217. For each of the vents 216, the pinion end plate 52 forms an orifice 218 which extends from each of the vents 216 to the ambient environment. Each of the vents 216 and corresponding orifices 218 thus form passageways 222 to provide fluid communication between the second venting cavity 182 and the environment so that air from the pinion end chamber 78 which may flow along the interface 197 through the first labyrinth seal 157, the first venting cavity 158, second labyrinth seal 174 and into the second venting chamber 182 may be bled off to the environment.

Referring to FIG. 6, in conjunction with FIG. 3, to provide fluid communication between the bearing cavity 116 and the interior of the gearcase 76, the outer ring 104 forms one and preferably three bleed orifices 224. If the bearing cavity 116 is pressurized relative to the chamber 109 formed by the gearcase 76, air flows from the bearing cavity through the bleed orifices 224 to the chamber to equalize the pressure.

The bleed orifices 224 include an upper axially extending portion 224a which extends to the interior of the gearcase through opening 226 and also a generally radially extending portion 224b. The bleed orifices are preferably grouped about the upper portion of the end ring 104 to prevent oil in the bearing cavity from draining into the gear case, thus bypassing and failing to lubricate the bearing. To prevent the oil being sprayed about in the gearcase 76 from entering the bleed orifices 224, a generally planar splash guard 228 is positioned just rearward of the opening 226. As noted above, the oil exit passageways 127 also may serve as vents from the bearing cavity 116 to the interior of the gearcase 78.

Referring to FIG. 2, in operation, cooling air from the plenum chamber 96 flows through the bellows 98 into the pinion end chamber 78. The introduction of the cooling air causes the pinion end chamber to become pressurized relative to the atmosphere and the chamber 109 formed by the gearcase 76.

Referring to FIGS. 2 and 3, as the axle gear 72 rotates the outer tip of the axle gear dips into oil which is collected at the bottom of the gearcase 76. The centrifugal force of the rotating axle gear 72 causes the oil to spray about the chamber 109. A portion of the oil which is sprayed about the gearcase chamber 109 is collected within an oil collection well 100. Referring to FIG. 6, the oil flows from the oil collection well 100 through the lubricating port 114 into the bearing chamber 116.

The oil in the bearing chamber 116 lubricates the bearings 194 and flows out of the bearing chamber through the exit passageway 127. Should the bearing chamber 116 become pressurized so that the chamber is at a higher pressure than the pressure of the oil in the well 100, the flow of oil into the chamber may be hindered.

Referring to FIG. 4, pressurized air in the pinion end chamber 78 may flow along the interface 197, the housing 132 and the rotatable assembly 133. As the air flows along the interface 197, the first labyrinth seal 157 restrains the flow. Air which leaks through the first labyrinth seal 157 and flows along the interface 197 flows into the first venting port 159 and may be vented through passageway 214 to the atmosphere.

Referring to FIG. 5, air which may flow through the first venting chamber 159 rearward along the interface 197 is restrained by the second labyrinth seal 174. The air which leaks through the second labyrinth seal 174 and flows along the interface 197 flows into the second venting cavity 182 where it may be vented to the atmosphere through passageway 222.

Referring to FIG. 6, air which may flow from the second venting chamber 182 rearward along the interface 197 may be restrained by the third labyrinth seal 184. Air which may leak through the third labyrinth seal 184 along the interface 197 may flow in the bearing chamber 116. Should the flow of air along the interface 197 into the bearing chamber 116 cause the bearing chamber to become pressurized relative to the gearcase chamber 109, air vents from the bearing chamber through the third venting passageways 224 into the gearcase chamber. Thus, should air penetrate through the series of labyrinth seals and venting chambers into the bearing chamber 116, the air will be vented into the gearcase chamber 109 to prevent pressure in the bearing chamber from exceeding the pressure of oil in the oil collection well 100 which is also in the gearcase chamber.

With the above embodiment, the introduction of pressurized air into the motor for cooling does not create an air pressure differential between the bearing chamber and oil pressure feed which may hinder the flow of lubricating oil into the chamber. Instead, the bearing assembly creates a series of labyrinth seals and venting chambers which restrict the flow of pressurized air from within the motor into the bearing chamber 116.

A specific embodiment of the novel AC traction motor with drive end bearing assembly according to the present invention has been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A drive end bearing assembly for a traction motor, the motor having a pinion end plate and a pinion end chamber forward of the pinion end plate to receive pressurized cooling air for the motor, the motor also including a rotatable shaft which extends rearward through an aperture formed in the end plate, the assembly comprising:

bearing means operably supported within the aperture for rotatably supporting the shaft, the bearing means being disposed within a bearing cavity;

a housing attached to a forward face of the pinion end plate, the shaft extending through the housing;

a rotatable element attached to and circumscribing the shaft between the housing and shaft, the housing and rotatable element forming an interface whereby air from the pinion end chamber may flow to the bearing cavity, the housing and rotatable element configured to form a plurality of labyrinth sealing means for restraining the flow of the air along the interface, the housing and rotatable element also configured to form a plurality of venting chambers along the interface among the labyrinth sealing means with at least one venting chamber being disposed between adjacent labyrinth sealing means, the housing forming portions of venting passageways extending between a corresponding venting chamber and a first low pressure reservoir whereby air flowing into the venting chambers is vented off to the reservoir.

2. The bearing assembly of claim 1 wherein the rotatable element includes a forward collar attached to the shaft, the forward collar and a forward end of the housing configured to form a first labyrinth means of the plurality of labyrinth means, a sleeve affixed to and circumscribing the shaft rearward of the forward collar, the sleeve and the housing adapted to form a first venting chamber, and a rearward collar circumscribing the shaft, the rearward collar and a rearward end of the housing configured to form at least a portion of a second labyrinth means of the plurality of labyrinth means, the first venting chamber being along the interface between the first and second labyrinth means.

3. The assembly of claim 2 wherein the housing is comprised of, a plurality of rearward annularly extending flanges with an outer annular and an inner annular flange of the plurality forming an annular groove therebetween, an annular surface extending forward of the rearward flanges, and a groove extending radially outward from the annular surface, the groove and the sleeve forming the first venting chamber.

4. The bearing assembly of claim 3 wherein the rear collar includes a first forward extending annular flange extending about the inner annular flange of the housing.

5. The bearing assembly of claim 4 wherein the rear collar forms a second forward extending annular flange radially outward from the first annular flange of the rear collar, the outer flange of the housing extending between the first and the second annular flange of the rear collar to form a second labyrinth sealing means.

6. The bearing assembly of claim 4 wherein the sleeve, the inner annular flange of the housing and the first annular flange of the rear collar, form a second labyrinth seal.

7. The bearing assembly of claim 4 wherein the first annular flange of the rear collar extends into a rear portion of the annular groove, the portion of the annular groove forward of the forward extending flange forming a second venting chamber of the plurality of venting chambers.

8. The bearing assembly of claim 7 wherein venting passage-way corresponding to the second venting chamber extends between the second venting chamber and the first low pressure reservoir whereby air flowing rearward along the interface into the second venting chamber is vented off to the reservoir.

9. The bearing assembly of claim 8 wherein the atmosphere forms the reservoir.

10. The bearing assembly of claim 1 including a rearward end plate assembly attached to the pinion end plate, the shaft extending through the rearward end plate, the rearward end plate, the housing, and the rotatable element forming the bearing cavity, the bearing end plate forms a venting passageway extending between the bearing chamber and a second low pressure reservoir whereby air flowing rearward along the interface into the bearing cavity is vented off to the second reservoir.

11. The bearing assembly of claim 10 wherein the shaft extends from the motor into a gearcase and the interior of the gearcase forms the second reservoir.

12. A pinion end bearing assembly for supporting and sealing about a shaft which extends through the frame of a traction motor, such as an AC traction motor, the assembly comprising:

a rearward end plate assembly attached to the frame;

a housing attached to the frame, the shaft extending through the housing; and a rotatable element attached to and circumscribing the shaft between the housing and shaft, the rotatable element and the housing adapted to form a series of three labyrinth seals to restrain the flow of air from within the motor to a bearing chamber, the housing and rotatable element also adapted to form venting chamber means, with the seals being separated by the venting chamber means, for venting to at least one low pressure reservoir, air which may flow through the labyrinth seals.

* * * * *